May 3, 1949.　　　　H. E. WEBBER　　　　2,468,793
HIGH-FREQUENCY RESISTOR
Original Filed Dec. 6, 1943　　　　4 Sheets-Sheet 1
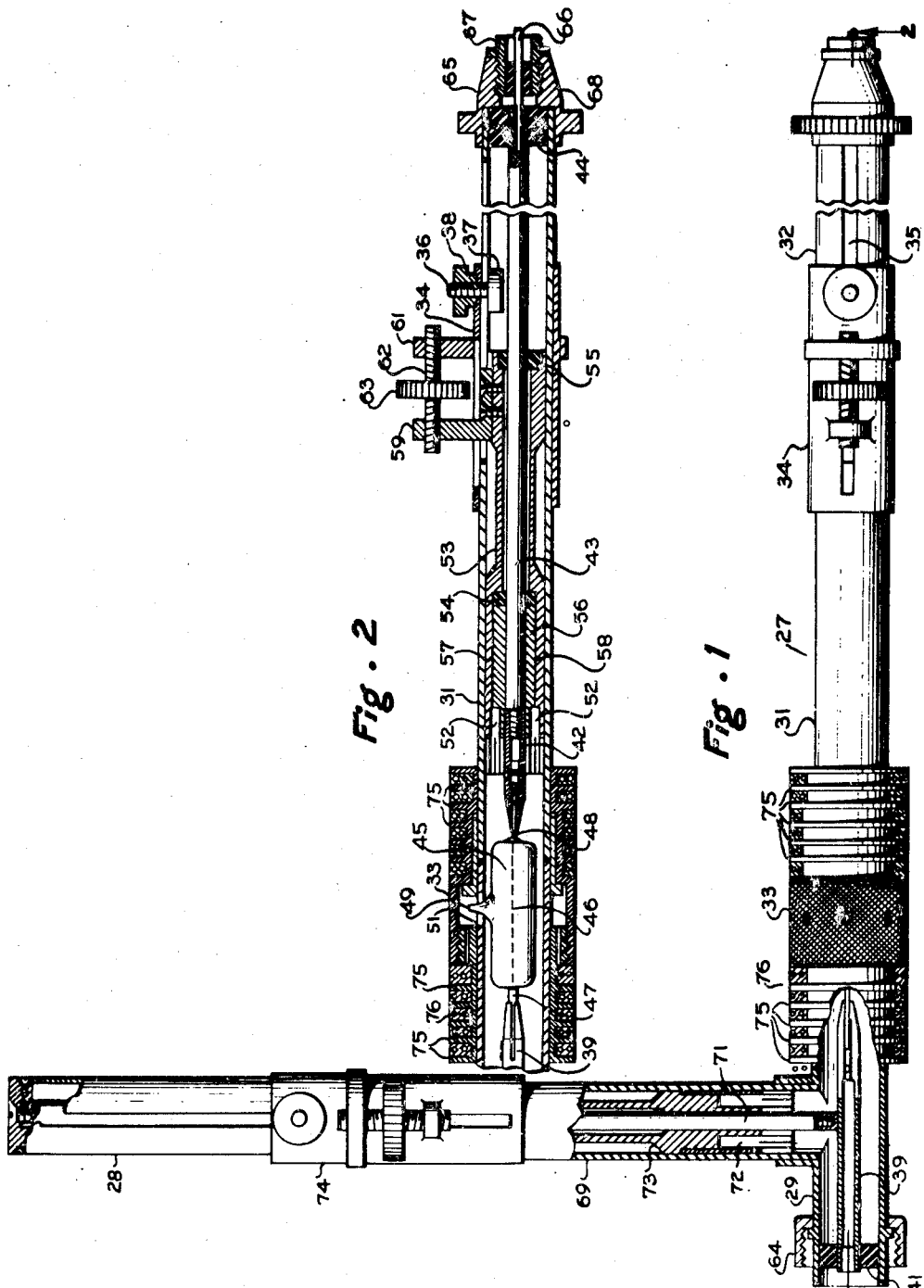
INVENTOR
HUGH E. WEBBER
BY
ATTORNEY May 3, 1949.　　　　　H. E. WEBBER　　　　　2,468,793
HIGH-FREQUENCY RESISTOR
Original Filed Dec. 6, 1943　　　　　　　　　　　4 Sheets-Sheet 2
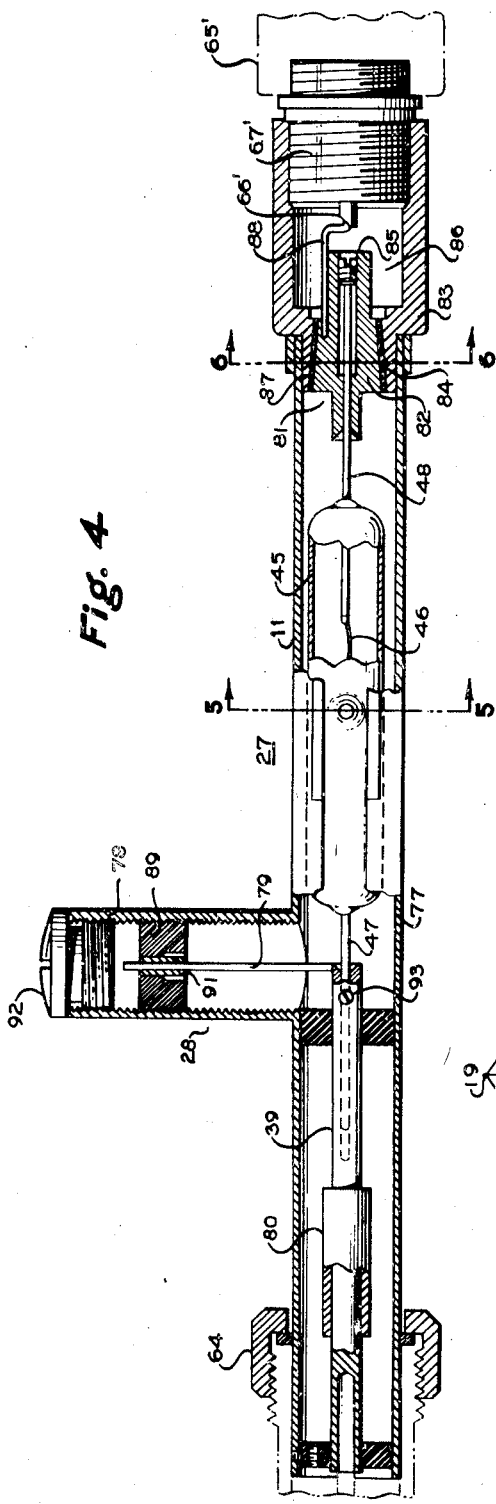
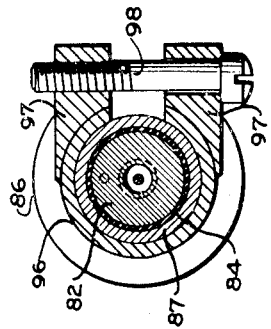
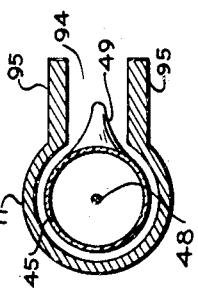
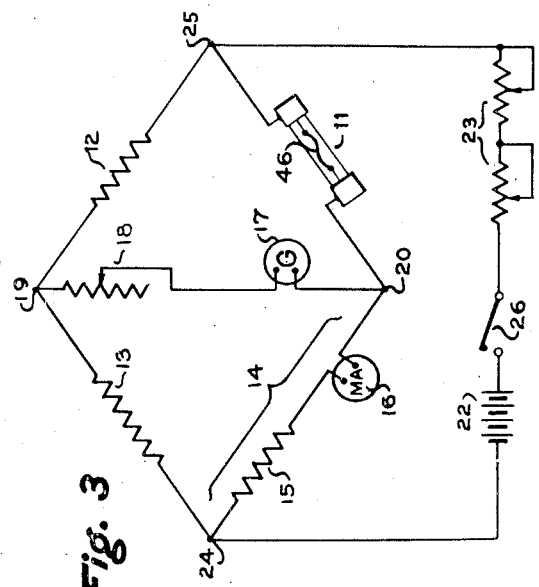
INVENTOR
HUGH E. WEBBER
BY
ATTORNEY May 3, 1949. H. E. WEBBER 2,468,793
HIGH-FREQUENCY RESISTOR
Original Filed Dec. 6, 1943 4 Sheets-Sheet 3
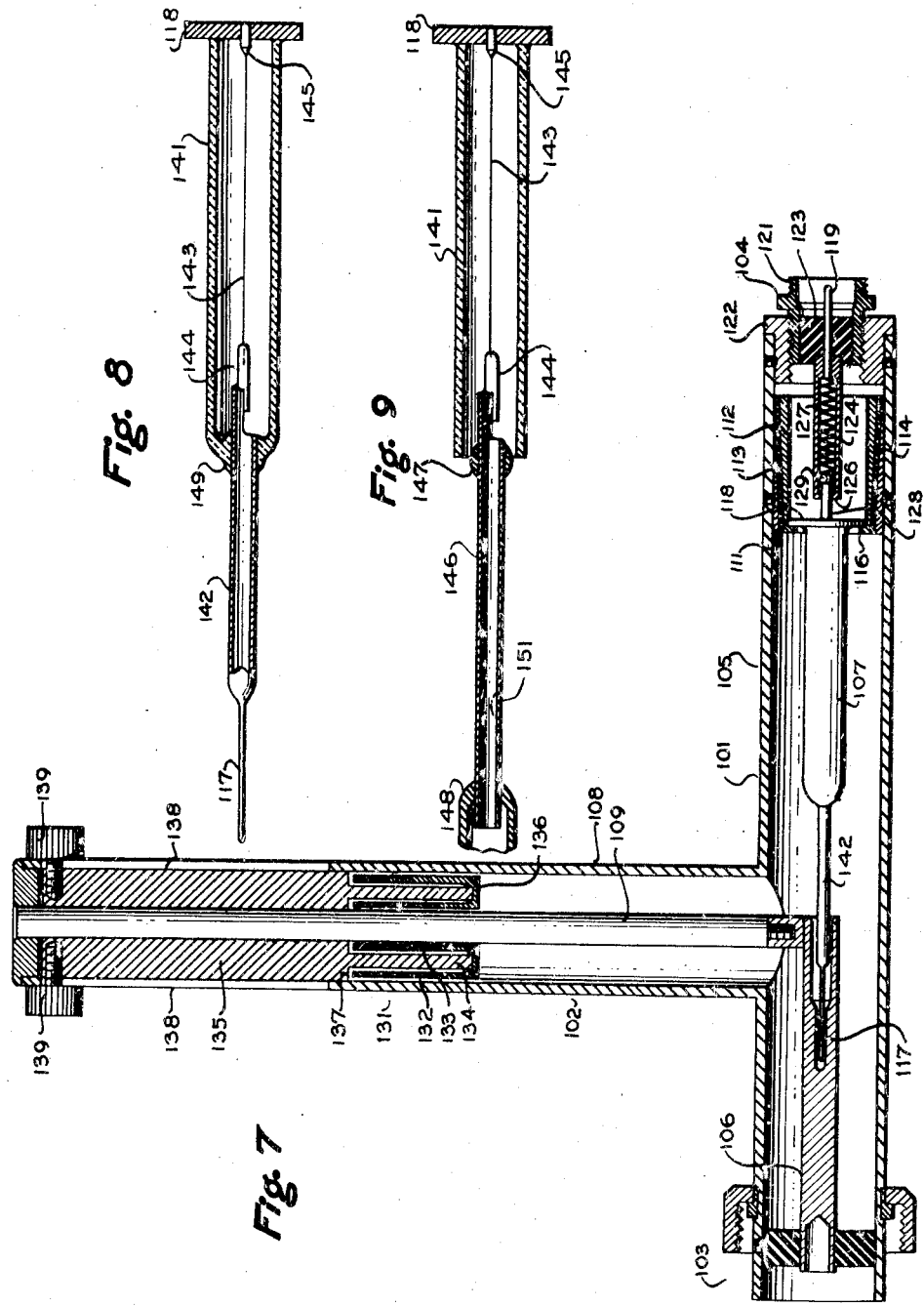
INVENTOR
HUGH E. WEBBER
BY Paul B. Hunter
ATTORNEY May 3, 1949.     H. E. WEBBER     2,468,793
HIGH-FREQUENCY RESISTOR
Original Filed Dec. 6, 1943     4 Sheets-Sheet 4
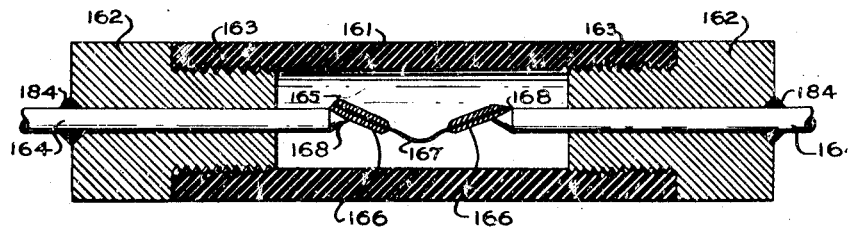
Fig. 10
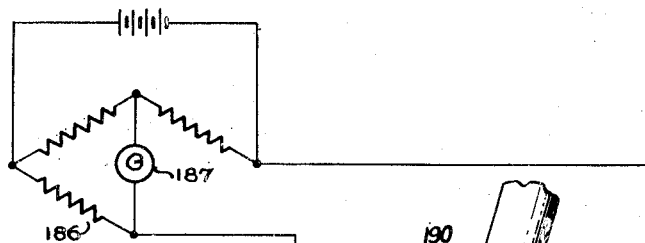
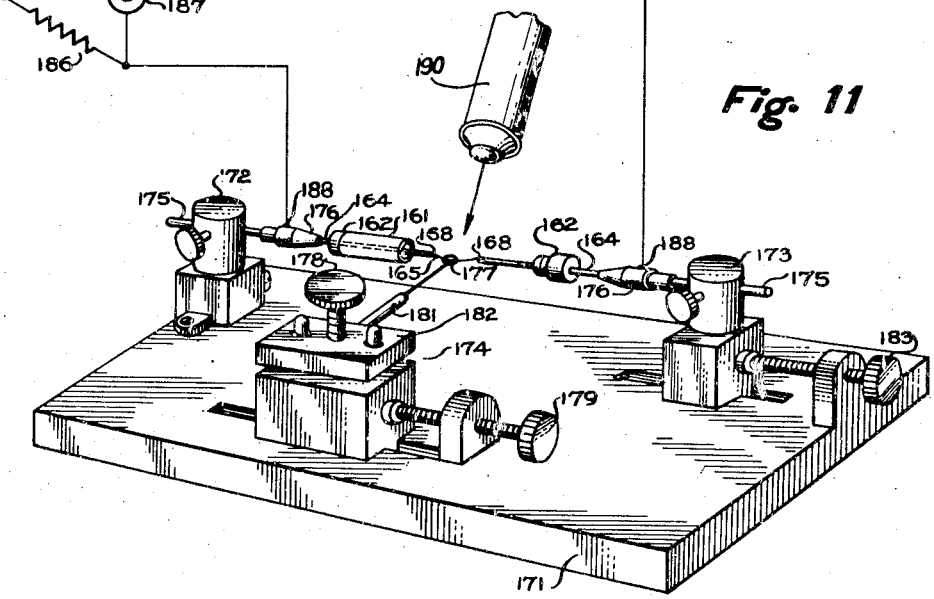
Fig. 11
INVENTOR
HUGH E. WEBBER
BY
ATTORNEY Patented May 3, 1949

2,468,793

UNITED STATES PATENT OFFICE 2,468,793

HIGH-FREQUENCY RESISTOR

Hugh E. Webber, Hempstead, N. Y., assignor to The Sperry Corporation, a corporation of Delaware Original application December 6, 1943, Serial No. 513,164. Divided and this application December 18, 1944, Serial No. 568,629

14 Claims. (Cl. 201—67)

1

My invention relates to power measurement and concerns, particularly, methods and apparatus for the measurement of power at high frequencies such as in the microwave region.

An object is to provide a concentric line hot wire holder which may readily be opened for replacement of the hot wire unit.

Another object is to provide a hot wire holder which may readily be adjusted or tuned for measuring high frequency power at different frequencies.

An additional object is to provide a hot wire element suitable for measurement of large amounts of power.

Further, an object of the invention is to provide a broad band wattmeter and a wire holder therefor obviating the necessity for tuning.

Another object is to provide methods for making improved resistive hot wire elements and to provide a machine suitable for making hot wire elements adapted for the measurement of small amounts of power.

Other and further objects and advantages will become apparent as the description proceeds.

This application is a division of my co-pending application, Serial Number 513,164, filed December 6, 1943, for Power measurement.

A better understanding of the invention will be afforded by the following detailed description considered in conjunction with the accompanying drawings, in which Fig. 1 is a view partially in section of a microwave wattmeter having a wire holder of the concentric line type represented as partially cut by a plane passing through the axes of both the main line and the lateral shorting stub;

Fig. 2 is a longitudinal section of the apparatus of Fig. 1, represented as cut by a plane 2—2 through the axis of the main line and perpendicular to the plane defined by the axis of the main line and the shorting stub in Fig. 1;

Fig. 3 is a ciruit diagram of a power measuring bridge in which a hot wire mounted in a concentric line may be employed as one arm of the bridge;

Fig. 4 is a view, mainly a longitudinal section, of a wire holder for use in a relatively narrow range of frequencies;

Fig. 5 is a cross-sectional view of a portion of the apparatus of Fig. 4, cut by a plane 5—5 as seen when looking in the direction of the arrows;

Fig. 6 is a corresponding cross-sectional view of a portion of the apparatus of Fig. 4, cut by a plane 6—6;

2

Fig. 7 is a cross-sectional view of a hot wire holder in which the hot wire element is mounted at a current anti-node;

Fig. 8 is an enlarged detail view of the hot wire unit shown in Fig. 7;

Fig. 9 is a sectional view illustrating a step in the process of manufacture of the hot wire unit shown in Fig. 8;

Fig. 10 is a longitudinal sectional view of a hot wire unit of the Wollaston wire type designed for measurement of small amounts of power;

Fig. 11 is a perspective view of a machine for preparing and assembling the hot wire unit of Fig. 10, without rupturing the delicate wire filament.

Like reference characters are utilized throughout the drawings to designate like parts.

Fig. 1 illustrates a wire holder and a hot wire suitable for use in a bridge circuit, such as shown in Fig. 3. One arm 11 of the bridge represents the hot wire holder of Fig. 1. The bridge shown in Fig. 3 comprises in addition to the hot wire unit 11, a compensating resistor 12, a standard bridge arm 13 and a fourth bridge arm 14, consisting of a resistor 15, and a current responsive instrument such as a milliammeter 16 in series. A conventional null-indicating galvanometer 17 and a sensitivity-adjusting rheostat 18 are connected in series between conjugate points 19 and 20 of the bridge to form a conventional diagonal bridge arm. A source of direct current 22 in series with rheostats 23 is connected to the remaining conjugate points 24 and 25 of the bridge. As shown, a switch 26 is connected in series with the power current source 22.

The resistances of the bridge arms are so chosen that at a predetermined temperature of the hot wire in unit 11, the bridge will be in balance and this temperature is usually the one existing when the maximum safe power is being supplied to the hot wire unit 11. For maximum sensitivity, the resistances of the four arms may be made substantially equal. The resistance of the resistor 15 is so chosen that the sum of its resistance and the resistance of the milliammeter 16 will equal the desired resistance for the bridge arm 14.

When the resistances of the four arms are made equal the total direct current power input to the bridge may readily be calculated from the measured current input and the resistance of the arms. The direct power consumption in unit 11 is then one-fourth the power input. However, by making the resistances of the arms of 11 and 14 equal regardless of the resistances chosen for the arms 12 and 13, and connecting the milliammeter 16 in series with the resistor 15 to form the arm 14, direct current power consumption in the arm 11 may be calculated directly from the reading of the instrument 16 and the resistance of the arm 14.

The wire holder shown in Fig. 1 comprises a main concentric line 27 consisting of an outer cylinder and an inner rod and a stub line 28 also consisting of an outer conductor and an inner rod. Both lines 27 and 28 are made adjustable in effective electrical length for tuning purposes. The outer conductor of the main line 27 comprises tubular members 29 and 31. The members 29 and 31 are arranged to be separable but are designed to be fastened together in a fixed relation during operation of the apparatus by a threaded sleeve coupling 33.

The inner conductor of the main line 27 comprises a hollow rod 39 secured at the lefthand end of the tubular member 29 by an insulating bushing 41, a hollow rod 42, threaded to a solid rod 43 extending to the righthand end of the tubular member 31 and supported at the righthand end by an insulating bushing 44, and a barretter wire or a Wollaston wire 46 mounted in an evacuated tube 45 to form the unit 11 with wire terminals 47 and 48 making contact with the tubular rods 39 and 42, respectively.

The bulb 45 of the hot wire element 11 is shown with a tip 49 at the side resulting from the evacuation and sealing off of the bulb. To provide space for the tip 49, the connector sleeve 33 is therefore made of sufficient diameter and an opening 51 is left at one side of the tubular member 29 to receive the tip 49.

For varying the electrically effective length of the line 27, a slidable line closer is provided comprising wipers 52 adapted to make electrical connection with the inner surface of the tubular member 31, carried by a hollow member 53 which is slidably supported by the rod 43 through insulating bushings 54 and 55. For further supporting the member 53, the rod 43 is provided with a sleeve 56 secured thereto, and for insulating an enlarged portion 57 of the hollow rod 53 from the sleeve 56 a cylinder of insulating material 58 is interposed between the members 56 and 57.

For setting the member 53 in longitudinal position it is secured to a wavelength adjusting sleeve 34 which is in turn adapted to be adjustably secured to the tubular member 31 by means of a screw 36 reaching through a slot 35 in the tubular member 31 with a head 37 inside the tubular member 31 and a securing nut 38 adapted to bear against the outer surface of the wavelength adjusting sleeve 34.

For making finer adjustments in wavelength a micrometer adjusting head is provided, comprising a post 59 secured to the righthand end of the member 53, for example, by means of machine screws as shown; a post 61 integral with the sleeve 34 and a right and lefthand screw 62 threaded into openings in the posts 59, 61 and carrying a knurled adjusting head 63.

For permitting microwave energy to be fed to the line 27, and to pass through the barretter wire 46 from another concentric transmission line (not shown) a conventional concentric line coupling 64 is provided at the lefthand end of the line 27. It will be understood that such a coupling provides for making electrical connection to the outer conductor 29 and the inner conductor 39, from corresponding elements of the supply line (not shown).

For making direct current connections with the barretter wire 46, a coupling unit 65 is provided comprising an inner terminal 66 making electrical contact with the internal rod 43 of the concentric line 27, and an outer screw thread terminal 67 making electrical connection with the outer conductor of the tubular member 31 through a metallic member 68. As previously mentioned the insulators 44, 54 and 58 are provided to prevent creating a direct-current short circuit between the tubular member 31 and the inner rod 43. In order that a direct-current return path from the lefthand terminal 47 of the barretter wire 46 may be made through the outer conductor of the concentric line without short-circuiting or producing reflections in the high frequency circuit, the stub line 28 is provided.

The stub line 28 comprises an outer conductor 69, which is electrically connected to the outer conductor members 29 and 31 of the main line 27, and an inner conductor rod 71, which is electrically connected to the inner conductor member 39 of the main line 27. For tuning out any reflections which might tend to be caused by the presence of the wire 46 in the inner conductor of the line 27, and for making the electrical length of the stub line 28 such as to interpose no impedance in the main line 27, the stub line 28 is so constructed that it may be varied in wavelength in a manner similar to that described for the main line 27. Thus, the line 28 is also provided with spring contact members 72 carried by a member 73 and a longitudinal adjusting sleeve 74 provided with coarse and micrometer adjustments as in the case of the sleeve 34.

It will be understood that when the electrical wavelength of the line 28 is equal to an odd number of quarter-waves of the microwave energy fed to the line 27, a direct connection between the inner and outer conductors of the upper end of the stub line 28 will have no effect on the main line 27. In order to avoid reflections from the righthand end of the line 27 back toward the input end 64 the righthand end of the electrical portion of the line 27 should constitute a short circuit with respect to radio frequency. This is accomplished by making the conducting members 57 and 56 and the insulating sleeve 58 between them of sufficient length to form a by-pass condenser. Therefore, with respect to high frequency, the members 57 and 56 may be considered to be electrically connected.

A direct-current circuit may be traced from the direct-current terminal 66 through the rod 43, the barretter wire terminal 48, the wire 46, the wire terminal 47, the inner conductor 39, inner conductor 71, the member 73, the contact fingers 72, the outer conductor 69 of the stub line 28, the outer tubular member 29 of the main line 27, the outer tubular member 31 thereof, the metallic fitting 68 and back to the second direct-current terminal 67.

For the purpose of compensating the bridge of Fig. 3 for variations in ambient temperature, which would tend to vary the resistance of the wire 46 for a predetermined power dissipation, a compensating resistor may be mounted in close proximity to the wire 46 so as to be subjected to substantially the same ambient temperature. This resistor may be one of the arms of the bridge, for example, the arm 12 as previously mentioned.

For mounting the resistor 12 in close proximity to the wire 46, a resistor spool may be found around the barretter wire and bulb 45, comprising retaining discs or flanges 75 formed in a sleeve 76 and in the coupling sleeve 33. Resistance wire of suitable size is wound between the flanges 75 to produce a total resistance of the value desired for the arm 12 of the bridge. Since the wire of the compensating resistor is not protected by enclosure in an evacuated bulb, it will be understood that the wire will need to be relatively heavy and therefore made of considerable length in comparison with the length and thickness of the wire 46.

When a power measurement is to be made, before the microwave energy is supplied to the coupling 64, the bridge of Fig. 3 is balanced by adjustment of the rheostats 23 until the current flowing through the barretter wire 46 is such as to produce a standard resistance of the bridge and causing null indication of the galvanometer 17. The milliammeter 16 is then read to ascertain the direct-current power consumption of the arm 11 or 14. Thereupon the direct-current power supply to the bridge is reduced to prevent overloading and burning out of the wire 46, and microwave power is supplied to the wire 46 through the connection 64. The rheostats 23 are again adjusted until a balance is obtained by the null indication of the galvanometer 17. The milliammeter 16 is again read and the value of the alternating power input is then determined by the difference between the direct power inputs to the wire 46 before and after admission of the alternating current power.

When relatively little frequency variation in the microwave input is to be expected, the longitudinal adjustment of the main line 27 is not needed and the stub line 28 is utilized only for making a direct current return connection from the lefthand terminal 47 of the barretter wire 46. For example, as shown in Fig. 4, the wire holder may take the form of a concentric line unit having a main line 27 and stub line 28. The main line 27 comprises an outer cylinder 77, the lefthand inner rod 39 and the barretter wire unit 11; the stub line 28 comprises an outer cylinder 78 and an inner rod 79. A longitudinally slidable, adjustable-ratio impedance-matching transformer or matching sleeve 80 may be provided.

For the purpose of shorting the righthand end of the main line 27 with respect to alternating current a by-pass condenser 81 is formed at the righthand end of the main line 27. The by-pass condenser 81 comprises a metallic fitting 82 with a tapered or conical outer surface and a second fitting 83 with a tapered inner surface mating the outer surface of the fitting 82, but separated therefrom by insulating sheet material 84 to form a condenser. The fitting 82 is electrically connected to the terminal 48 of the wire 46 by a suitable means such as by means of an abutting screw 85, and the fitting 83 has a hollow portion 86, adapted to receive a conventional direct current coupling 65', and a neck portion 87 fitting inside and making electrical contact with the righthand end of the outer conductor member 77. The direct current coupling 65' includes an outer threaded terminal 67', making electrical contact with the member 83, and an inner terminal 66' connected by a conductor 88 to the fitting 82.

For adjusting electrical length of the stub line 28 the inner surface of the cylinder 78 is threaded and a threaded nut or plug 89 is provided which carries contact fingers 91, engaging the inner conductor rod 79. A closing cap 92 may be provided. It will be understood that the plug 89 is provided with recesses (not shown) whereby a suitable tool may be utilized for rotating the plug 89 in the threaded inner surface of the cylinder 78.

In this case the direct-current electrical circuit from the inner connector terminal 66' takes place through the conductor 88, the fitting 82, the barretter wire terminal 48, the barretter wire 46, its terminal 47, the inner conductor 39, the inner conductor 79, contacts 91, plug 89, cylinder 78 and the outer cylinder 77 back to the neck portion 87 of the fitting 83 and the threaded terminal 67'.

To permit mounting and replacing the barretter wire unit 11, the fitting 83 is made removable, the inner conductor 39 is made hollow at the end and it is provided with a set screw 93 for receiving and fastening the terminal 47 of the Wollaston wire 46. An opening (not shown) is provided in the cylinder 77 to provide access to the screw 93 by means of a screwdriver. To provide space for the tip 49 of the bulb 45, a channel 94 (Fig. 5) is provided in the side of the hollow cylinder 77, and the sides of the slots 94 are provided with longitudinal ribs 95. For securing the fitting 83 to the righthand end of the hollow cylinder 77 a clamp (Fig. 6) is provided comprising a split ring 96 secured to clamping jaws 97 cooperating with a clamping screw 98.

When broad band characteristics are required for a wattmeter, a wire holder may be employed in which the barretter wire is mounted at the current anti-node or loop in a concentric transmission line and this is accomplished by making the operative portion of the barretter wire substantially less than the operative wavelength. As illustrated in Fig. 7 the wire holder comprises a concentric transmission line 101 and a lateral stub 102 with a conventional input connection 103 at the lefthand end of the line for receiving power from a concentric line (not shown), and a direct current connector 104 at the righthand end.

The main line 101 comprises a hollow-cylindrical outer conductor 105, an inner conductor rod 106 and a barretter wire unit 107. The lateral stub 102 comprises a hollow-cylindrical outer conductor 108 joined to the cylinder 105 and a center rod 109. For electrically insulating the righthand end of the hot wire unit 107 from the outer conductor 105, with respect to direct current while maintaining a short circuit at the righthand end of the line 101 with respect to alternating current, a by-pass condenser 111 is formed at the righthand end of the line 101. Such a condenser may comprise a pair of concentric cylinders 112 and 113 with mating tapered adjacent surfaces separated by a sheet of insulating material 114. The outer member 113 is in electrical contact and joined to the inner surface of the outer cylinder 105; and the inner member 112 is provided with an internal flange 116 for making electrical contact with the righthand end of the barretter wire unit 107.

The barretter wire unit 107, which will be described in greater detail hereinafter in connection with Fig. 8, includes a lefthand terminal 117 fitting into a suitable axial opening in the rod 106 and a righthand terminal or metallic end plate 118 adapted to fit against the flange 116 of the condenser member 112. The direct current connector 104 includes an inner prong terminal 119 and an outer threaded terminal 121. For securing the outer threaded terminal 121 in the righthand end of the hollow cylinder 105 and making electrical connection therebetween a metallic bushing 122 is provided. A pierced insulating plug 123 is provided for supporting the prong 119 within the outer threaded terminal 121.

For holding the plate 118 of the wire 107 against the flange 116 in the by-pass condenser 111, and for making an electrical connection between the connector prong 119 and the end plate 118, a spring unit is provided comprising a tube 124 provided with internal flange 126 at the lefthand end, secured at the righthand end to the insulator plug 123 and containing a compression spring 127, and a spring-pressed contact pin 128 protruding the opening at the lefthand end of the tube 124 and having a head 129 abutting the spring 127 within the tube 124.

For terminating the stub line 102, a wave trap 131 is provided, comprising a pair of concentric hollow cylinders 132 and 133, internally and externally spaced from, but electrically and mechanically connected to a hollow cylindrical extension 134 of a hollow longitudinally slidable plug 135 fitting the inner surface of the hollow cylinder 108. As shown, the hollow cylinders 132 and 133 are electrically connected to the hollow cylinder 134 at the lower end thereof by means of an annular member 136. The hollow cylinders 132 and 133 are spaced from the inner conductor rod 109 and the outer conductor hollow cylinder 108 as well as from the hollow cylinder extension 134, and are spaced also from shoulders 137 in the plug 135. The cylinders 132 and 133 are made substantially one-quarter wave in length for the average wavelength of microwave frequency to be measured or one-half wavelength from the radio frequency end (over one-quarter wavelength section and down to bottom or dead short again) in order to provide a complete termination at the lower end of the plug 135.

To permit adjustment of the electrical length of the stub line 102 in terms of wavelengths, the hollow cylinder 108 may be provided with slots 138, and screws 139 cooperating with the slots 138 and threaded into plug 135 may be provided. If the proper length of the stub line 102 is determined beforehand, it will not be necessary to provide such adjustment, and the barretter wire unit 107 will absorb microwave energy over a range of frequencies extending 40% above and below the mid band frequency for which the apparatus is designed without producing any reflections. As shown, the barretter wire unit 107 is entirely symmetrical with respect to the longitudinal axis through its terminal rod 117, has no laterally extending sealing tip and utilizes a flat end plate terminal 118. This shape and structure facilitates the mounting arrangements, permits the simplification of the construction of the outer cylinder 105 and also makes it possible to connect the righthand end of the power-absorbing wire of the unit 107 directly at the current anti-node.

As shown in greater detail in Fig. 8, the unit 107 comprises a cylindrical glass bulb 141 closed at the righthand end by a metallic end plate 118, having a sealed metallic tube 142 coaxially joined thereto at the lefthand end, and containing a barretter wire 143. For completing the electrical connections between the lefthand rod terminal 117 and the end plate 118 through the barretter wire 143, the wire 143 is provided with terminal lugs 144 and 145 welded to the ends of the wire 143 and in turn welded or soldered to the tube 142 and the end plate 118, respectively.

The glass of which the tube 141 is composed, and the metal of which the end plate 118 and the tube 142 are composed are preferably so chosen as to have the same temperature coefficient of expansion. For example, relatively low temperature coefficient of expansion material may be employed such as an alloy known as Kovar alloy, for the elements 118 and 142, and a glass such as that known as 9X or 705 glass may be employed for the tube 141.

The barretter element 107 may be prepared in the following manner. Referring to Fig. 9, a metallic tube 146 is prepared by banding it at the righthand end with a globule of glass 147 and sealing the lefthand end to a tube 148 adapted to be connected to an evacuating pump (not shown). A length of wire 143 of suitable material such as one-mil tungsten wire, for example, is secured to the lugs 144 and 145, the lug 144 in turn is secured to the righthand end of the tubular stock 146 and the glass tube 141 is then slipped over the wire 143 and the righthand end of the tubular stock 146. Thereupon the lug 145 is secured to the end plate 118 and the righthand end of the glass tube 141 is sealed to the abutting surface of the end plate 118, which is in the shape of a flat disc. Thereupon a flame is applied to the lefthand end of the glass tube 141 and the glass globule 147 until a seal 149 is formed as shown in Fig. 8. Thereupon the evacuating pump is started and the space within the tubes 141 and 146 is evacuated to a pressure of several microns of mercury. Hydrogen or an inert gas may be introduced if the wire 143 is intended to absorb relatively large amounts of power. Otherwise, a vacuum is retained within the tube 141. Thereupon a flame is applied to the point 151 in the tubular stock 146 until the metal softens sufficiently to permit drawing out whereby the stem 117 (shown in Fig. 8) is formed. It will be understood that the vacuum is not cut off the tube 148 until the opening in the stem 117 has been closed.

When extremely low power at microwave frequency is to be measured, it is necessary to employ a barretter such as a Wollaston wire unit in which the Wollaston wire is extremely fine in order to be sensitive and it is necessary to employ a mounting capsule therefor which has low loss characteristics. A suitable form of Wollaston wire unit for low power measurements is illustrated in Fig. 10. The unit comprises a capsule consisting of a hollow cylinder 161 composed of low loss insulating material and a pair of brass end plugs 162 threaded into the tube 161. A plastic material, for example, such as polystyrene may be employed for the tube 161. In order to insure a strong joint without danger of stripping the threads in the polystyrene material, relatively fine threads 163 are employed. The plugs 162 are drilled to receive terminal rods 164. The Wollaston wire itself consists of a length of fine platinum wire 165 with a silver coating 166 for strength and with a center loop 167 having the silver coating etched away so that the microwave energy is actually dissipated in the center loop portion 167. The silver coated ends 166 are electrically connected as by spot welding or soldering to inner tips 168 of the terminal rods or pins 164.

The Wollaston wire of the desired fineness is prepared by drawing down silver-coated platinum wire. For low power measurements where platinum wire with a diameter of .00005 inch may be desired, the bare platinum wire is so fragile that great care must be taken in constructing the Wollaston wire unit and mounting the wire in the capsule.

For this purpose a jig such as in Fig. 11 may be employed. The jig comprises a base plate 171 carrying a stationary rod-holding post 172, a longitudinally adjustable post 173 and a third adjustable support 174. The posts 172 and 173 carry removably secured rods 175, which in turn carry pin chucks 176.

Preparatory to forming a Wollaston wire capsule, terminal pins 164 are inserted in the pin chucks 176. Brass end plugs 162 are slipped over the pins 164 and one of the plugs 162, for example, that shown at the left in Fig. 11, has an insulating tube 161 threaded onto it and also surrounding the terminal pin 164. The plugs 162 and the tube 161 are pushed back so that the inwardly extending tips 168 of the terminal pins 164 are exposed. Thereupon a length of silver-coated platinum wire 165, which has previously been drawn down to the desired size, is secured to the tips 168.

For etching away the silver coating at the center portion of the Wollaston wire 165 in order to expose the bare loop 167 (Fig. 10), a platinum inoculating loop 177 is provided containing a droplet of suitable etching solution such as nitric acid.

The inoculating loop 177 is secured to the support 174, which is also provided with adjustments including a vertical adjustment controlled by a micrometer screw 178 and preferably also a longitudinal adjustment controlled by a micrometer screw 179. The inoculating loop 177 has a shaft 181 secured to a movable head 182 of the adjustable support 174.

After the silver coated Wollaston wire 165 has been soldered or welded to the terminal pin tips 168, and before the inoculating loop 177 is brought into proximity, the longitudinal position of the adjustable post 173 is set by means of a micrometer screw 183 so that the wire 165 forms a slightly sagging curve of desired radius. Thereupon the inoculating loop 177 containing the droplet of nitric acid is moved toward the sagging wire 165 from below until contact has been made and the sagging portion of the wire is immersed in nitric acid. The diameter of the inoculating loop may be approximately two millimeters, for example. For hastening the etching a microscope 190 having a microscope lamp may be provided which is so mounted as to focus the beam of the microscope lamp on the immersed portion of the wire in the inoculating loop 177, thus raising the temperature of the acid.

In order to prevent the surface tension of the acid from pulling the fine wire apart while the inoculating loop is being withdrawn after the etching has been completed, the drop is preferably slowly lowered by means of the micrometer screw 178. In order to hasten the process and in order to guard against breakage, the acid may be replaced partially by a droplet of low-surface-tension solvent such as ether, before the inoculating loop 177 is completely lowered. Thereafter, the wire is rinsed with ether and later dilute ammonia to neutralize acid, and the insulating tube 161 may be slipped over the etched wire and threaded to the remaining end plug 162 at the right. The plugs 162 are then soldered to the terminal pins 164, as shown at 184, in Fig. 10, care being taken to avoid melting the polystyrene tube 161 during this process. If more or less of the silver coating is to be etched the size of the inoculating loop may be changed or the loop may be moved back and forth along the wire by the micrometer screw 179.

If desired the resistance of the exposed portion 167 of the wire may be checked as the etching is going on by connecting the wire to a suitable resistance-measuring device such as a Wheatstone bridge 186. The bridge 186 is a conventional four-armed bridge including a null galvanometer 187 and having the wire 165 connected as a fourth arm of the bridge by means of suitable terminal clips 188 which may be connected to or snapped over the pin chucks 176. The bridge 186 is so adjusted that the galvanometer 187 will reach balance when the wire 167 has increased to the desired resistance, making due allowance for the effect of the droplet of nitric acid in the loop 177.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A power-absorbing wire unit for a microwave wattmeter, comprising an insulating tube, a power-absorbing wire therein extending longitudinally thereof, a conducting end plate electrically connected to one end of the wire, and a conducting tube extending longitudinally from the opposite end of the insulating tube and electrically connected to the other end of the wire, whereby the unit has a flat terminal at one end and an extending pin terminal at the other end.

2. The method of making a power-absorbing wire unit for a microwave wattmeter, comprising the steps of uniting a wire to a conducting tube, surrounding the joint of said wire and the connected conducting tube with an insulating tube, uniting the opposite end of the wire with a conducting disc plate, uniting the said plate to one end of the insulating tube, uniting the remaining end of the insulating tube to the conducting tube, evacuating the bulb so formed through the conducting tube and sealing off the conducting tube.

3. The process set forth in the preceding claim including the additional step of drawing out the conducting tube to form an attenuated longitunally extending pin terminal before sealing off the tube.

4. The method of making a power-absorbing wire unit for a microwave wattmeter comprising the steps of connecting a wire between a flat-plate terminal and a metallic rod terminal, surrounding the wire with an insulating tube, sealing the ends of the insulating tube to the plate and the rod terminal respectively to form a wire-enclosing bulb.

5. The method of claim 4, wherein the rod terminal is hollow, and the additional steps are performed of evacuating the bulb through the hollow rod and sealing off the hollow rod.

6. A method of preparing an axially symmetrical evacuated power-absorbing unit, comprising the steps of forming a bulb having an insulated body with a conducting flat plate terminal at one end and longitudinally extending conducting tube terminal at the other end, uniting a wire to the conducting terminals, and evacuating the bulb through the conducting tubing.

7. A power-absorbing unit for an alternating current bridge, comprising an insulating tube, connecting plugs at the ends thereof closing the tube, pin terminals extending through said plugs and a power-absorbing wire unit constituting a substantially pure resistive element at the operating electrical wavelengths connected between said pin terminals, said wire unit having a central operative portion of reduced diameter.

8. A low-loss power-absorbing unit for a microwave wattmeter, comprising in combination, an insulating tube, a pair of metallic plugs threaded into and closing the ends of the tube, pin terminals extending axially through the plugs and fixed thereto, and a power-absorbing wire electrically connected between the inner ends of the pin terminals.

9. The method of making a power-absorbing unit for a microwave wattmeter which comprises the steps of supporting a pair of terminal-forming pins substantially in line with each other, with a space between the adjacent ends, sliding a closing plug over one pin, sliding over the other pin a closing plug having an insulating tube attached thereto coaxially with the pin, attaching a length of power absorbing wire between the adjacent ends of the terminal pins, sliding the insulating tube and its attached plug axially to cover the power-absorbing wire, closing the open end of the tube by inserting the first-mentioned plug, and electrically securing the plugs to the pins.

10. A power absorbing unit for a high-frequency watt-meter, comprising an enclosed tube, connecting plugs closing the ends of said tube, pin terminals protruding from the inner side of said plugs, and a power absorbing wire constituting a substantially pure resistive element at the operating electrical wavelengths connected between said pin terminals, said wire unit having an operative portion of reduced diameter.

11. A barretter unit for a high frequency transmission line, comprising an insulating tube, connecting plugs attached to the end portions thereof and being provided with interior substantially aligned current conducting projections, and a power absorbing wire within said insulating tube and connected at its ends to said projections for conveying current therebetween, said wire being designed so as to provide substantially pure resistance at the operating electrical wavelengths.

12. A barretter unit for a high-frequency coaxial transmission line, comprising a cylindrical dielectrical tube, cylindrically shaped connecting plugs attached to said tube, said plugs having a diameter substantially equal to said tube diameter and provided with interior cylindrically protruding terminal pins, a substantially pure resistive high-frequency power-absorbing filament electrically connected to and longitudinally supported by said terminal pins, said filament having an operative portion of its length of reduced diameter, and the operative portion of said filament being substantially less than the operating electrical wavelength.

13. A power-absorbing unit for a high-frequency watt-meter, comprising a cylindrical dielectric tube, cylindrically shaped conducting plugs attached to said tube and having a diameter substantially equal to said tube diameter and provided with cylindrically protruding terminal pins, a substantially pure resistive high-frequency power-absorbing filament connected to said terminal pins, said filament having an operative portion of its length of reduced diameter.

14. A power-absorbing wire unit for a microwave watt-meter, comprising an insulating tube, a power-absorbing wire therein extending longitudinally thereof, a conducting disc-shaped plate electrically connected to one end of said wire, and conductive closing means extending longitudinally from the end of said insulating tube and electrically connected to the other end of said wire.

HUGH E. WEBBER.

REFERENCES CITED

The following references are of record in the file of this patent:

UNITED STATES PATENTS

| Number | Name | Date |
| --- | --- | --- |
| 623,730 | McCutcheon | Aug. 25, 1899 |
| 794,459 | Hogg | July 11, 1905 |
| 923,797 | McNeill | June 1, 1909 |
| 1,506,852 | Morrison | Sept. 2, 1924 |
| 1,531,955 | Kingman | Mar. 31, 1925 |
| 1,683,067 | Dubilier | Sept. 4, 1928 |
| 1,740,391 | Campbell | Dec. 17, 1929 |
| 1,862,014 | Grondahl | June 7, 1932 |
| 2,144,888 | Mever et al. | Jan. 24, 1939 |
| 2,185,025 | Elenbaas et al. | Dec. 26, 1939 |
| 2,203,545 | Peterson | June 4, 1940 |
| 2,233,546 | Meulendyke | Mar. 4, 1941 |
| 2,265,821 | Siegel | Dec. 9, 1941 |
| 2,359,302 | Curtis | Oct. 3, 1944 |

FOREIGN PATENTS

| Number | Country | Date |
| --- | --- | --- |
| 222,564 | Great Britain | Oct. 2, 1924 |
| 557,541 | Great Britain | Nov. 24, 1943 |